United States Patent [19]

Bonaddio

[11] 4,213,550
[45] Jul. 22, 1980

[54] METHOD OF AND APPARATUS FOR INITIATING A DAMAGE-FREE SCORE IN A REFRACTORY MATERIAL

[75] Inventor: Robert M. Bonaddio, Fresno, Calif.

[73] Assignee: PPG Industries, Inc., Pittsburgh, Pa.

[21] Appl. No.: 949,347

[22] Filed: Oct. 6, 1978

[51] Int. Cl.² .................. C03B 33/02; B26D 3/08; B26F 3/00
[52] U.S. Cl. ........................... 225/2; 83/880; 83/884; 225/96.5
[58] Field of Search .................. 225/2, 96, 96.5; 83/880, 884, 882

[56] References Cited

U.S. PATENT DOCUMENTS

| | | | |
|---|---|---|---|
| 3,800,991 | 4/1974 | Grove et al. | 225/2 |
| 3,865,293 | 2/1975 | Ernsberger et al. | 225/2 |
| 3,865,673 | 2/1975 | De Torre | 225/96.5 X |
| 4,057,184 | 11/1977 | Michalik | 225/2 |

Primary Examiner—Frank T. Yost
Attorney, Agent, or Firm—Donald Carl Lepiane

[57] ABSTRACT

A glass ribbon advances through a first scoring station where a conventional score is imposed in the ribbon to provide a zone of damage to initiate a subsurface score and thereafter through a second scoring station where the subsurface score is imposed in the ribbon.

17 Claims, 6 Drawing Figures

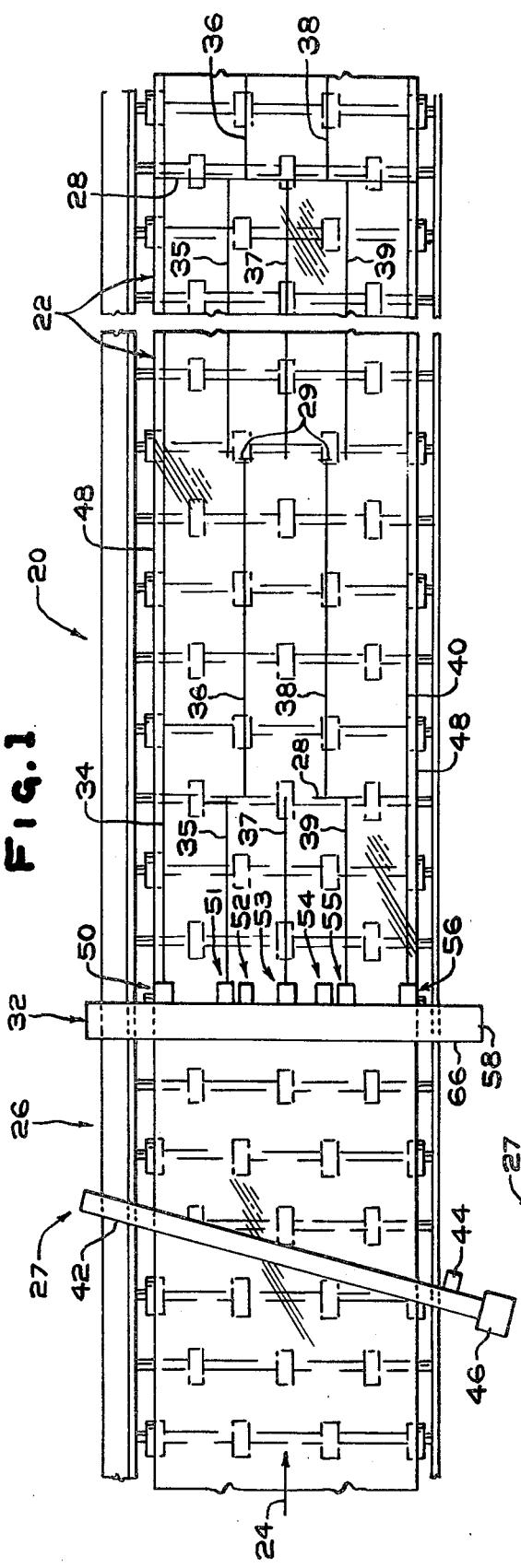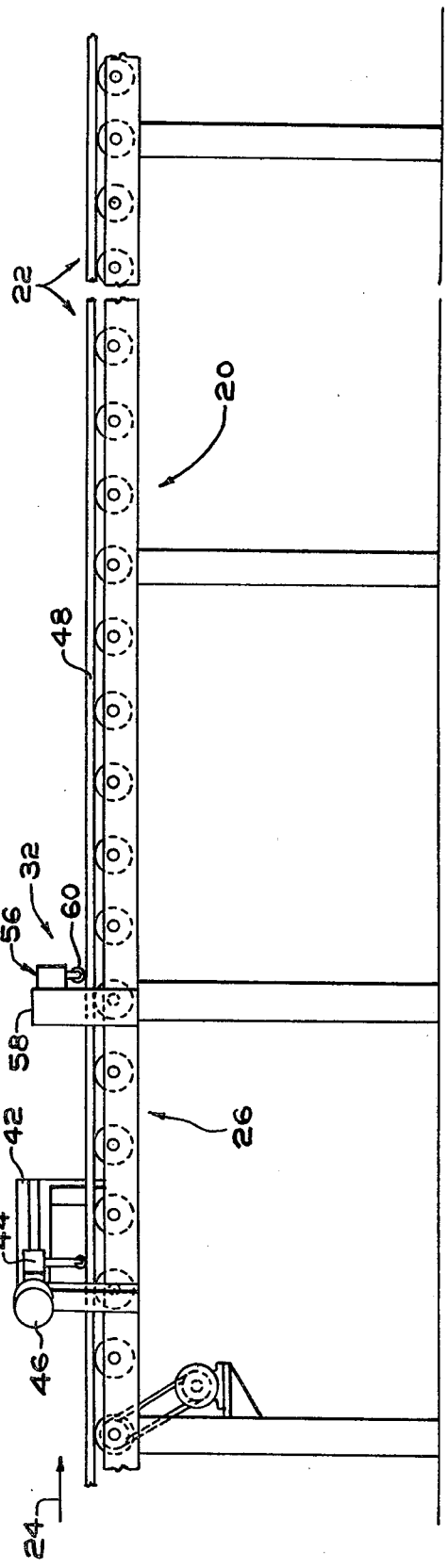

METHOD OF AND APPARATUS FOR INITIATING A DAMAGE-FREE SCORE IN A REFRACTORY MATERIAL

BACKGROUND OF THE INVENTION

1. Field of the Invention

This invention relates to a method of and an apparatus for intitating a damage-free score e.g. a subsurface and/or psuedosubsurface score in a piece of refractory material.

2. Discussion of the Prior Art and Technical Problems.

U.S. Pat. Nos. 3,865,293; 3,865,673; and 4,057,184 teach techniques of imposing scores that are free of surface damage in refractory material such as ceramics, glass and/or glass ceramics. These types of scores are known as subsurface scores and/or psuedosubsurface scores. The term "subsurface score" as used herein is defined in U.S. Pat. No. 3,865,673 which, in general, defines a subsurface score as an essentially spall or wing-free discontinuity or fissure such as an intentionally induced crack or score respectively that is within the thickness of a refractory piece and extends substantially perpendicular to its major surfaces but does not extend to or connect either major surface of the piece. The term "psuedosubsurface score" as used herein is defined in U.S. Pat. No. 3,865,673 which, in general, defines a psuedosubsurface score as an intentionally induced discontinuity or fissure in a piece of refractory material that extends substantially perpendicular to its major surfaces, that does not appear itself to extend or connect to either major surface of the piece but which is accompanied by a microscopic zone of damage essentially spall or wing-free material which is disposed between or extends between its tip and the major surface of the piece. For purposes of simplicity, the term "damage-free score" is used herein to refer to a subsurface score and/or a psuedosubsurface score.

The advantage of imposing a damage-free score in a refractory piece to sever same is that the resultant severed edge is essentially in a pristine condition i.e., has essentially maximum edge strength. U.S. Pat. No. 3,979,243 in Column 6, lines 23–49 teaches that a damage-free score is initiated at a zone of damage. The zone of damage as taught therein is imposed in the refractory piece by applying an initial force to the scoring wheel approximately 20% greater than the selected scoring force or initially impacting the surface of the piece to be scored with a force of about 20% greater than the selected scoring force. U.S. Pat. No. 4,057,184 in Column 6, lines 47–59 teaches that the zone of damage is generated by tapping the surface of the piece to be scored with a rigid object; impacting the surface of the piece with a scoring wheel; or rotatably urging the scoring wheel against the surface of the piece.

Limitations of the prior art techniques of initiating a damage-free score are for practical purposes non-existent when the piece of refractory material is stationary. When a piece of refractory material, e.g., a glass ribbon is continually moving the prior art techniques are not acceptable. This is because the prior art technique for initiating a damage-free score teaches that the scoring wheel be tapped or rotated to initiate the damage-free score. As can be appreciated, acting on a wheel as it is powered by a glass ribbon moving at speeds of up to 600 inches per minute (15 meters per minute) is hazardous. Further the prior art suggests that a zone of damage be imposed in a glass piece but is silient as to the equipment or manner employed to accomplish this result on a moving glass ribbon. It would be advantageous, therefore, to provide techniques of initiating damage-free scores in a moving ribbon.

SUMMARY OF THE INVENTION

This invention relates to a method of initiating a damage-free score in a moving piece, i.e., a plate or ribbon of refractory material selected from the group consisting of glasses, ceramics and glass-ceramics. A zone of damage is inposed in the piece. The surface of the piece is engaged by facilities capable of imposing a damage-free score in spaced relation to the zone of damage and thereafter the piece and scoring facilities are moved relative to one another in a continuous motion to move the scoring facilities through the damage zone to initiate the damage free score. The scoring facilities and piece are continuously moved relative to one another to impose a damage-free score in the piece.

This invention also relates to an apparatus for initiating the damage-free score in the moving ribbon. The apparatus includes facilities for advancing the ribbon along a ribbon movement path under fracture imposing facilities and thereafter under damage-free score imposing facilities. As the ribbon passes under the fracture imposing facilities a fracture(s) or zone(s) of damage is (are) imposed in the ribbon along a path transverse to the article movement path.

BRIEF DESCRIPTION OF THE DRAWING

FIG. 1 is a top elevated view of a conveyor section having a scoring station for imposing a damage-free score in a moving ribbon in accordance with the teachings of the invention;

FIG. 2 is a side view of the conveyor section of FIG. 1;

DESCRIPTION OF THE INVENTION

Figure 3:
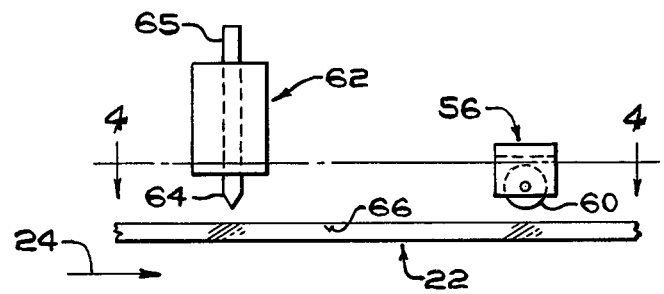
FIG. 3 is a side view of an alternate embodiment of a scoring station for imposing a damage-free score in a moving ribbon in accordance to the teaching of the invention.

In the following discussion, like numbers refer to like elements. FIGS. 1 and 2 show a conveyor section 20 of the type used in the art for advancing a glass piece e.g. a glass ribbon 22 in the direction of arrow 24 i.e. along a movement path through a scoring station 26 incorporating features of the invention. The scoring station 26 includes (1) a lateral scoring position 27 for selectively imposing lateral zones of damage 28 and/or 29 and (2) a longitudinal scoring position 32 for imposing longitudinal damage-free scores 34–40 in the ribbon 22 in a manner to be discussed below.

The lateral scoring position 27 is not limiting to the invention and may be any of the types used in the art for imposing a zone of damage in the form of a conventional score. The term "conventional score" as used herein is defined as a score or fracture extending from a major surface of the piece or ribbon into the thickness of the piece and have surface damage about the score in the form of wing and/or spall.

In general, the lateral scoring position 27 includes a bridge 42 advantageously mounted above and transverse to the ribbon movement path 24. A scoring assembly 44 powered by motor 46 moves along the bidge 42 transverse to the movement path 24 in any conventional manner. Preferably the bridge 42 is mounted with the path direction of the scoring assembly 44 and the direction of the movement path 24 subtending an oblique angle so that the score lines 28 and 29 are generally perpendicular to the direction of the movement path 24. A bridge arrangement that may be used in the practice of the invention but the invention is not limiting thereto is taught in U.S. Pat. No. 3,244,337 which teachings are hereby incorporated by reference.

As shown in FIG. 1., the scoring assembly 44 imposes conventional scores 28 extending between the edges 48 of the ribbon, or a plurality of conventional scores 29 between the ribbon edges 48. Normally continuous scores 28 are used to initiate the damage-free scores and thereafter the ribbon is severed along the conventional scores 28 in any conventional manner into glass sections (not shown). Although the mechanism(s) that initiates damage-free scores at a zone of damage is (are) not completely understood, it is believed that surface damage and/or fractures in the glass establish stresses in the tensile zone of the glass to initiate the damage-free score. As is appreciated by those skilled in the glass art, opposed surfaces of a glass piece are in tension for having a depth of about 20% of the glass thickness. A series of experiments were conducted to establish that a zone of damage in at least the tensile zone of the glass, i.e., a zone of damage in the surface of the glass initiates a damage free score.

In the following experiments, the scoring apparatus for imposing damage-free scores included a scoring housing mounted on the end of a pivotally mounted arm. A predetermined load was mounted on the scoring housing to provide a scoring load. A sled supporting the glass piece was moved under the scoring housing by a cable connected to an endless belt driven by a variable motor.

The first series of experiments used a metal stylis to provide a zone of damage on a piece of glass. In one instance the surface of a piece of float glass about 0.088 inch (0.22 centimeter) thick was lightly scratched with the metal stylis to rough about a ¼ inch (0.064 centimeter) wide portion of the glass score. A scoring wheel having a diameter of about 7/32 inch (0.56 centimeter) and a radius scoring surface of about 0.0005-0.001 inch (0.012-0.024 millileter) was rotatably mounted in the scoring housing. The scoring wheel was positioned downstream of the roughened surface and the sled moved at a speed of about 720 inches per minute (18 meters per minute). A damage-free score was observed to initiate at the roughened surface. The scoring wheel was repositioned and the sled advanced at the same speed. Again a damage-free score was observed to initiate at the roughened surface.

The surface of the piece was scratched with the metal stylis to provide a fissure having a depth of about 0.003 inch (0.076 centimeter). The scoring wheel was repositioned downstream of the score and the sled advanced at the above speed. A damage-free score was observed to initiate at the scratch. The wheel was repositioned and the sled advanced at the same speed. As before, a damage free score was initiated at the scratch.

The following table lists additional experiments performed using the above-identified scoring apparatus to initiate a damage-free score at a conventional score. The conventional score was imposed by hand scoring. Attempts to make heavy and light scores were made by increasing and decreasing, respectively, hand pressure. The conventional score for experiment numbers 1–12 were made using a 7/32 inch (0.56 centimeter) diameter wheel having a 145° scoring angle. The conventional score for experiment numbers 13–17 were made using a 7/32 inch (0.56 centimeter) diameter wheel having a 134° scoring angle. The scoring wheel for imposing the damage-free score in experiment numbers 1–6 had a diameter of 2 inches (5.08 centimeter) and a scoring surface having a radius of 0.015 inch (0.038 centimeter). The scoring wheel for imposing the damage-free scores in experiment numbers 7–17 had a diameter of 7/32 inch (0.56 centimeter) and a scoring surface having a radius of 0.0005-0.0010 inch (0.013-0.026 centimeter).

| Experiment Number | Glass Thickness Inches (centimeters) | Fissure Depth of Conventional Score Inches (centimeters) | Load on Scoring Wheel for Imposing Damage-Free Score Pounds (kilograms) | Glass Speed inches/minute (meter/minute) | Damage-Free Score Initiated |
|---|---|---|---|---|---|
| 1. | 0.4872 (1.24) | 0.016 (0.041) | 412 (187.1) | 50 (1.25) | Yes |
| 2. | 0.4872 (1.24) | <0.005/(0.0130) | 353 (160.3) | 100 (2.50) | No |
| 3. | 0.4872 (1.24) | 0.0125 (0.032) | 353 (160.3) | 50 (1.25) | Yes |
| 4. | 0.4872 (1.24) | 0.0138 (0.035) | 353 (160.3) | 100 (2.50) | No |
| 5. | 0.4872 (1.24) | Present-Not Measured | 353 (160.3) | 50 (1.25) | No |
| 6. | 0.4872 (1.24) | 0.0147 (0.037) | 294 (133.5) | 50 (1.25) | No |
| 7. | 0.0897 (0.228) | 0.0069 (0.018) | 12 (5.45) | 720 (18) | Yes |
| 8. | 0.0897 (0.228) | 0.0055 (0.014) | 12 (5.45) | 720 (18) | Yes |
| 9. | 0.0897 (0.228) | 0.006 (0.015) | 2 (5.45) | 720 (18) | Yes |
| 10. | 0.088 (0.224) | 0.0042 (0.011) | 10 (4.54) | 720 (18) | No |
| 11. | 0.088 (0.224) | 0.0019 (0.005) | 11 (4.99) | 720 (18) | Yes |
| 12. | 0.088 (0.224) | 0.0119 (0.030) | 12 (5.45) | 720 (18) | Yes |
| 13. | 0.088 (0.224) | 0.0094 (0.024) | 12 (5.45) | 720 (18) | Yes |
| 14. | 0.088 (0.224) | 0.0057 (0.014) | 12 (5.45) | 720 (18) | Yes |
| 15. | 0.088 (0.224) | 0.0081 (0.021) | 12 (5.45) | 720 (18) | Yes |
| 16. | 0.0892 (0.227) | 0.0065 (0.017) | 12 (5.45) | 720 (18) | Yes |
| 17. | 0.0892 (0.227) | 0.0065 (0.017) | 12 (5.45) | 720 (18) | Yes |

A damage-free score was not initiated at the zone of damage in experiments 2, 4–6 and 10. No common factor appears to be present which would explain the reason for not initiating a damage-free score. In experiment 5 the depth of the conventional score was not measured because a damage-free score was not initiated. In total, 21 experiments were conducted and a damage-free score was initiated at a zone of damage 16 times. The remaining 5 times in which a damage-free score was not initiated may have been due to equipment problems. The above experiments are presented to demonstrate that a damage-free score can be initiated at a zone of damage, e.g., or from a conventional score or fissure in the surface of a glass piece.

In the practice of the invention it is recommended that the scoring wheel for imposing the damage-free score engages the surface of the glass in spaced relation to the zone of damage. In this manner, the stress field established by the scoring wheel for imposing the damage-free score is in the glass and moves through the zone of damage in a controlled manner.

As can be appreciated, the parameters in the above experiments are not limiting to the invention and are presented for illustration and discussion purposes only.

The longitudinal scoring position 32 has a plurality of scoring devices 50-56 mounted above the movement path 24 on bridge 58. The scoring devices 50-56 and bridge 58 are not limiting to the invention and may be any of the types used in the art for imposing a damage-free score in the glass ribbon 22. Preferably the devices 50-56 are adjustable on the bridge relative to one another so the longitudinal scores 34-40 may be spaced a predetermined distance from one another to provide glass sections of a predetermined width. As can now be appreciated, the invention is not limited to (1) the number of longitudinal scores imposed in the ribbon, (2) the scoring wheel and/or (3) scoring device employed to impose the longitudinal scores in the ribbon. The scoring device taught in U.S. Pat. No. 4,027,562; U.S. Pat. No. 4,102,227 or in U.S. patent application Ser. No. 801,712 filed in the name of John A. Goldinger on May 31, 1977 for "Scoring Device Having a Referencing Carriage" now U.S. Pat. No. 4,137,803 or in the scoring wheel taught in U.S. Pat. Nos. 3,865,293; 3,865,673 and 4,057,184 may be used in the practice of the invention and the teachings therein are hereby incorporated by reference.

In practice, a lateral conventional score 28 or scores 29 are imposed in the glass ribbon 22 at the lateral scoring position mounted upstream of the longitudinal scoring position 32. As the lateral conventional score(s) approach(s) the longitudinal scoring position 32, selected ones of the scoring devices 50-56 are acted on to urge their respective scoring wheel 60 (shown in FIG. 2) into engagement with the glass ribbon. The scoring wheels 60 are sized and loaded as taught in U.S. Pat. No. 4,057,184 to impose a subsurface score in the glass ribbon. The scoring wheel 60 of the actuated scoring devices rides on the glass ribbon until the lateral score lines 28 and/or 29 pass under the scoring wheels 60. A damage-free score is imposed in the glass ribbon when the conventional score 28 and/or 29 moves under and downstream of the actuated scoring devices. The damage-free score is continuously imposed in the ribbon until the score device is acted on to move its respective scoring wheel off the glass ribbon.

The above technique to impose damage-free scores in a glass ribbon is not limited to ribbon speed and may be practiced on a stationary glass sheet and/or ribbon. Further the invention contemplates imposing longitudinal conventional scores in the glass ribbon and thereafter initiating damage-free lateral scores at the conventional longitudinal scored.

Figure 4:
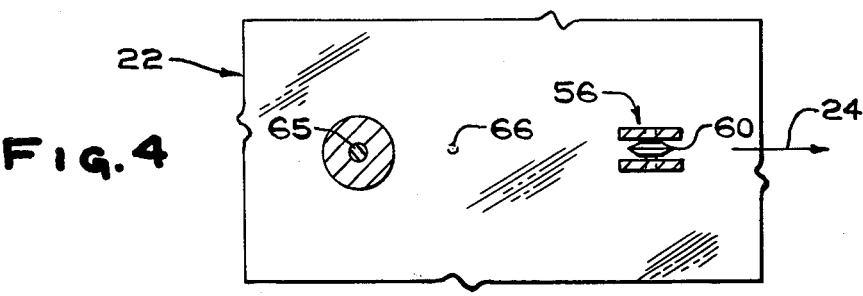
FIG. 4 is a view taken along lines 4—4 of FIG. 1.

With reference to FIGS. 3 and 4, the discussion will be directed to another technique for initiating a damage-free score in accordance to the teachings of the invention. Mounted upstream and in alignment with the scoring wheel 60 of scoring device 56, is a solenoid 62 having a metal stylis 64 mounted on solenoid shaft 65. The stylis 64 imposes a point fracture 66 in the glass ribbon 22 as shown in FIG. 4. The solenoid 62 is aligned with the scoring wheel 60 so that the fracture 66 is displaced under the scoring surface of the wheel 60 to initiate a damage free score. The speed of displacement of the shaft 65 toward and away from the glass ribbon is not limiting to the invention. However, as the speed of the ribbon increases the displacement speed of the solenoid shaft 65 increases to prevent increasing the length of the fracture 66 and/or bending the shaft 65. Solenoids that may be used in the practice of the invention are sold by Ledex Co. Cat. No. 6EC. The solenoids 62 may be mounted over the movement path 24 in any conventional manner, e.g. the solenoid 62 may be mounted on upstream side 66 of the bridge 58 in aligned with its respective one of the scoring devices 50-56 (see FIG. 1).

Figure 5:
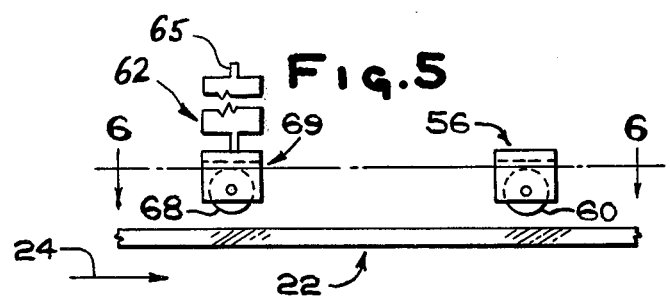
FIG. 5 is another embodiment of a scoring station for imposing a damage-free score in a moving ribbon in accordance with the teaching of the invention.
Figure 6:
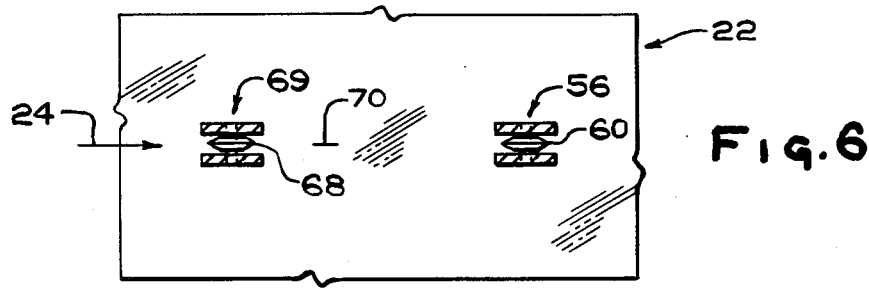
FIG. 6 is a view taken along lines 6—6 of FIG. 5.

Shown in FIGS. 5 and 6 is another embodiment of the invention which includes a conventional scoring wheel 68 mounted in a scoring device 69 similar to the scoring devices 51,-56 or on the end of the solonoid 62 as shown in FIG. 5. The rotating axis of the wheel 68 is preferably parallel to the rotating axis of the wheel 60 with the scoring surface of each wheel rotating through the same plane so that the conventional score 70 imposed in the glass ribbon is displaced under the scoring surface of the wheel 60 to initiate a damage-free score. The length of the fracture 70 is not limiting to the invention and should be minimized to reduce edge damage of the severed edge.

As can now be appreciated the invention is not limited to the above embodiments which were presented for illustration purposes only. Further, the invention may be practiced on refractory material other than glass, e.g., ceramics and/or glass ceramics and may be practiced on sheets of refractory material.

What is claimed is:

1. A method of initiating a damage-free score in a piece of refractory material selected from the group consisting of glasses, ceramics and glass-ceramics, comprising the steps of:
    imposing a zone of damage in the piece;
    engaging the piece at a position on the surface of the piece is spaced relation to the zone of damage with scoring means capable of imposing a damage-free score in the piece;
    moving the scoring means and zone of damage in a continuous motion relative to one another to move the scoring means through the zone of damage to initiate a damage-free score; and
    moving the piece and scoring means relative to one another to impose a damage-free score in the piece.

2. The method as set forth in claim 1 wherein said imposing step is accomplished by:
    urging a rigid object against the piece to fracture the piece; and
    moving the object away from the piece.

3. The method as set forth in claim 1 wherein said imposing step is accomplished by:
    scoring the piece with scoring means capable of imposing a conventional score in the piece.

4. The method as set forth in claim 3 wherein said imposing step further include the steps of:
    displacing the means capable of imposing a damage-free score in a first direction; and displacing the means capable of imposing a conventional score transverse to the first direction.

5. The method as set forth in claim 4 wherein the piece is a ribbon advancing along a ribbon movement path in the first direction.

6. The method as set forth in claim 5 further including the step of severing the ribbon at the conventional score.

7. The method as set forth in claim 3 wherein the piece is a ribbon moving along a ribbon movement path and said imposing step further includes the steps of:
   displacing the scoring means capable of imposing a conventional score away from the ribbon; and
   repeating said scoring step and said displacing step while the ribbon moves along the ribbon movement path to impose a plurality of spaced conventional scores in the ribbon between ribbon edges.

8. The method as set forth in claim 7 wherein the conventional scores are generally parallel to the direction of ribbon movement path.

9. The method as set forth in claim 7 wherein the conventional scores are transverse to the ribbon movement path.

10. An apparatus for initiating a damage-free score in an advancing piece of refractory material selected from the group consisting of glasses, ceramics, and glass-ceramics, comprising:
   means for advancing the piece along a movement path;
   means mounted above the path for imposing a fracture in the piece;
   means for imposing a damage-free score in the piece; and
   means for mounting said damage-free score imposing means above the movement path and downstream of said fracture imposing means.

11. The apparatus as set forth in claim 10 wherein said fracture imposing means includes:
   a solenoid having a pointed shaft; and
   means for actuating said solenoid to move said shaft toward and away from the movement path.

12. The apparatus as set forth in claim 10 wherein said fracture imposing means includes:
   a score wheel; and
   means for moving said wheel toward and away from the movement path to impose a zone of damage in the piece to initiate a damage-free score.

13. The apparatus as set forth in claim 12 wherein said means for imposing a damage-free score includes a scoring wheel and further including.
   means for mounting said scoring wheel of said fracture imposing means so that the axis is parallel to the axis of said scoring wheel of said means for imposing a damage-free score.

14. The apparatus as set forth in claim 13 wherein scoring surface of said scoring wheel of said fracture imposing means and scoring surface of said scoring wheel of said means for imposing a damage-free score are in the same plane.

15. The apparatus as set forth in claim 12 wherein said means for imposing a damage-free score includes a scoring wheel and further including:
   means for mounting said scoring wheel of said fracture imposing means so that the axis is transverse to the axis of said scoring wheel of said means for imposing a damage-free score.

16. The apparatus as set forth in claim 15 wherein said fracture imposing means further includes:
   means for moving said scoring wheel of said fracture imposing means toward and away from the piece.

17. The apparatus as set forth in claim 10, 11, 12, 14 or 16 wherein the piece is a continuous glass ribbon.

* * * * *